US008858678B2

(12) United States Patent
Kiesel et al.

(10) Patent No.: US 8,858,678 B2
(45) Date of Patent: Oct. 14, 2014

(54) SYSTEM AND METHOD FOR MAKING METALLIC IRON WITH REDUCED $CO_2$ EMISSIONS

(75) Inventors: Richard F. Kiesel, Hibbing, MN (US); David J. Englund, Bovey, MN (US); Mark Schlichting, Crawfordsville, IN (US); John Meehan, Conway, AR (US); Jeremiah Crouch, Conway, AR (US); Logan Wilson, Hot Springs, AR (US)

(73) Assignee: Nu-Iron Technology, LLC, Charlotte, NC (US)

( * ) Notice: Subject to any disclaimer, the term of this patent is extended or adjusted under 35 U.S.C. 154(b) by 84 days.

(21) Appl. No.: 13/499,021

(22) PCT Filed: Sep. 28, 2010

(86) PCT No.: PCT/US2010/050547
§ 371 (c)(1),
(2), (4) Date: Apr. 19, 2012

(87) PCT Pub. No.: WO2011/041313
PCT Pub. Date: Apr. 7, 2011

(65) Prior Publication Data
US 2012/0198966 A1 Aug. 9, 2012

Related U.S. Application Data

(60) Provisional application No. 61/246,817, filed on Sep. 29, 2009.

(51) Int. Cl.
*C22B 5/00* (2006.01)
*F27D 99/00* (2010.01)
*C21B 13/10* (2006.01)
*F27D 17/00* (2006.01)
*F27B 9/02* (2006.01)
*F27B 9/30* (2006.01)
*C21B 13/00* (2006.01)

(52) U.S. Cl.
CPC ............. *C21B 13/10* (2013.01); *F27D 17/008* (2013.01); *C21B 2100/04* (2013.01); *F27B 9/021* (2013.01); *F27D 17/004* (2013.01); *F27B 9/3005* (2013.01); *C21B 2100/02* (2013.01); *C21B 13/0046* (2013.01)
USPC ............. 75/484; 75/505; 266/178; 266/185; 266/156; 432/195

(58) Field of Classification Search
USPC .................... 75/484, 505; 266/178, 185, 156; 432/195
See application file for complete search history.

(56) References Cited

U.S. PATENT DOCUMENTS

2008/0023338 A1    1/2008    Stoots et al.
(Continued)

OTHER PUBLICATIONS

Figueroa et al., "Advances in CO2 Capture Technology—The U.S. Department of Energy's Carbon Sequestration Program", International Journal of Greenhouse Gas Control 2 (2008) 9-20.

(Continued)

*Primary Examiner* — George Wyszomierski
*Assistant Examiner* — Tima M McGuthry Banks
(74) *Attorney, Agent, or Firm* — Hahn Loeser & Parks, LLP; Arland T. Stein

(57) ABSTRACT

A method and system for making metallic iron nodules with reduced $CO_2$ emissions is disclosed. The method includes: assembling a linear hearth furnace having entry and exit portions, at least a conversion zone and a fusion zone, and a moving hearth adapted to move reducible iron bearing material through the furnace on contiguous hearth sections; assembling a shrouded return substantially free of air ingress extending adjacent at least the conversion and fusion zones of the furnace through which hearth sections can move from adjacent the exit portion to adjacent the entry portion of the furnace; transferring the hearth sections from the furnace to the shrouded return adjacent the exit portion; reducing reducible material in the linear hearth furnace to metallic iron nodules; and transporting gases from at least the fusion zone to the shrouded return to heat the hearth sections while in the shrouded return.

25 Claims, 9 Drawing Sheets

(56) References Cited

U.S. PATENT DOCUMENTS

2009/0158892 A1 6/2009 Govindaswami et al.
2009/0175753 A1 7/2009 Iwasaki et al.
2010/0031776 A1 2/2010 Englund et al.
2010/0107818 A1 5/2010 Bleifuss et al.

OTHER PUBLICATIONS

Li et al., "Impurity Impacts on the Purification Process in Oxy-Fuel Combustion Based CO2 Capture and Storage System", Appl Energ (2008), doi: 10.1016/j.apenergy.2008.05.006.
Liu et al., Simultaneous Easy CO2 Recovery and Drastic Reduction of SOx and NOx in O2/CO2 Coal Combustion with Heat Recirculation, Fuel 82 (2003) 1427-1436.

SYSTEM AND METHOD FOR MAKING METALLIC IRON WITH REDUCED CO$_2$ EMISSIONS

This patent application is a national stage of International Application No. PCT/US2010/050547, filed Sep. 28, 2010, claims priority to and the benefit of U.S. Provisional Application No. 61/246,817, filed Sep. 29, 2009.

GOVERNMENT INTERESTS

The present invention was made with support by the Department of Energy, Sponsor Award DE-FG36-05GO15185. The United States government has certain rights in the invention.

BACKGROUND AND SUMMARY OF THE DISCLOSURE

The present invention relates generally to a method and system for making metallic iron nodules (NRI) with reduced CO$_2$ emissions. Metallic iron nodules have been produced by reducing iron oxide such as iron ores, iron pellets, and other iron oxide sources. Various such methods have been proposed so far for directly producing metallic iron nodules from iron ores or iron oxide pellets by using reducing agents such as coal or other carbonaceous material.

Various types of hearth furnaces have been described and used for direct reduction of metallic iron nodules (NRI). One type of hearth furnace used to make NRI is a rotary hearth furnace (RHF). The rotary hearth furnace is partitioned annularly into a drying/preheating zone, a reduction zone, a fusion zone, and a cooling zone, between the supply location and the discharge location of the furnace. An annular hearth is supported rotationally in the furnace to move from zone to zone carrying reducible material the successive zones. In operation, the reducible material comprises a mixture of iron ore or other iron oxide source and reducing material such as carbonaceous material, which is charged onto the annular hearth and initially subject to the drying/preheat zone. After drying and preheating, the reducible material is moved by the rotating annular hearth to the reduction zone where the iron ore is reduced in the presence of the reducing material, and then to the fusion zone where the reduced reducible material is fused into metallic iron nodules, using one or more heating sources (e.g., natural gas burners). The reduced and fused NRI product, after completion of the reduction process, is cooled on the moving annular hearth in the cooling zone to prevent reoxidation and facilitate discharge from the furnace. Another type of furnace used for making NRI is the linear hearth furnace such as described in U.S. Pat. No. 7,413,592, where similarly prepared mixtures of reducible material are moved on moving hearth sections or cars through a drying/preheating zone, a reduction zone, a fusion zone, and a cooling zone, between the charging end and discharging end of a linear furnace while being heated above the melting point of iron.

A limitation of these furnaces and the methods of operating them has been their energy efficiency. The iron oxide bearing material and associated carbonaceous material generally had to be heated in the furnace from near ambient temperature to about 2500° F. (1370° C.), or higher, in order to reduce the iron oxide and produce metallic iron nodules (NRI). Additional energy was also consumed in heating the moving hearth, which may have cooled in transit between the discharging end and the charging end of the furnace.

The reduction process has generally required propane, methane, natural gas or coal to be burned to produce the heat necessary to heat the iron oxide bearing material and associated carbonaceous material to the temperatures necessary to reduce and fuse the iron oxide and produce a metallic iron material. Furthermore, the reduction process involved production of volatiles in the furnace that had to be removed from the furnace and secondarily combusted to avoid an environmental hazard, which added to the energy needs to perform the iron reduction. See, e.g., U.S. Pat. No. 6,390,810.

In addition to volatiles, nitrogen, carbon dioxide, and other exhaust gases were produced in the reduction and fusion processes. The carbon dioxide produced was typically mixed with nitrogen and other exhaust gases and not well adapted to being captured and processed by sequestration. Additionally, the exhaust gases produced often required additional scrubbing and other processing prior to release into the environment. Needed is a linear hearth furnace that reduces and conserves the energy required to reduce the iron oxide bearing material to metallic iron, while also reducing the carbon emissions to the environment.

A method of making metallic iron nodules with reduced CO and CO$_2$ emissions is disclosed that comprises the steps of:

a. assembling a linear hearth furnace having an entry portion and an exit portion, at least a conversion zone and a fusion zone and a moving hearth adapted to move reducible iron bearing material through the furnace on contiguous hearth sections, b. assembling a shrouded return substantially free of air ingress extending adjacent at least the conversion and fusion zones of the furnace through which hearth sections can move from adjacent the exit portion to adjacent the entry portion of the linear hearth furnace;

c. transferring the hearth sections from the linear hearth furnace to the shrouded return adjacent the exit portion;

d. reducing reducible material in the linear hearth furnace to metallic iron nodules; and e. transporting gases from at least the fusion zone to the shrouded return to heat the hearth sections while in the shrouded return.

The method of making metallic iron nodules may include the step of delivering commercially available O$_2$ gas to the conversion zone and fusion zone of the linear hearth furnace to reduce and fuse the reducible iron bearing material to metallic iron nodules and form CO$_2$ gas along with other exhaust gases. Oxygen may be mixed with combustible fuels, in addition to the fluids from the volatiles, so that a CO$_2$ gas is produced adapted for sequestration. The oxygen may also be mixed with other gases such as flue gas, carbon dioxide, or nitrogen to reduce the flame temperature and produce a gas with greater mass to convey heat through the furnace for more efficient reduction and fusion. In addition, at least a portion of the CO$_2$ and/or flue gas exhausted from the linear hearth furnace may be cleaned to produce a commercially viable CO$_2$ gas stream.

The method of making metallic iron nodules may comprise the step of directing CO$_2$ and/or flue gas from the conversion and fusion zones of the linear hearth furnace into the shrouded return to be used in heating the hearth sections during return to the entry portion of the furnace. Optionally, a portion of the flue gases may be circulated to a gasifier.

The method may include, prior to conversion and fusion of the reducible material in the linear hearth furnace, drying and preheating the reducible material in or prior to the linear hearth furnace. Alternatively, the method of making metallic iron nodules may include charging the hearth sections before or after entry into the shrouded return so as to heat reducible material as well as the hearth sections in the shrouded return.

The method may also include drying and preheating the reducible material in the shrouded return without substantial fluidization of volatiles in the reducible material. At least some of the carbon dioxide and other gas from the shrouded return may also be mixed with oxygen or combustible fuels and delivered to the conversion or fusion zones of the furnace to provide heat to reduce and form metallic iron bearing material in the furnace. Alternatively or in addition, volatiles in the reducible material may be fluidized during the drying and preheating in the shrouded return and may be transferred to the conversion and/or fusion zones of the linear hearth furnace for combustion.

The method of making metallic iron nodules may further comprise the step of providing a transfer guide adapted to transfer the hearth sections between the linear hearth furnace and shrouded return at both the entry portion and the exit portion of the furnace.

Also disclosed is a system for making metallic iron nodules with reduced CO and $CO_2$ emissions comprising:
a. a linear hearth furnace having an entry portion and an exit portion, at least a conversion zone and a fusion zone, and a moving hearth with a plurality of hearth sections adapted to move reducible iron bearing material through the linear hearth furnace on a guide, such as rails;
b. a shrouded return positioned adjacent the linear hearth furnace through which the hearth sections can move on a guide, such as rails, from adjacent the exit portion to adjacent the entry portion of the linear hearth furnace;
c. passageways adapted to transport gases generated in at least the fusion zone of the furnace to the shrouded return; and
d. transport devices adapted to transport the hearth sections from the exit portion of the furnace to the shrouded return and from the shrouded return to the entry portion of the furnace.

Additionally, a drying/preheat zone may be provided in or adjacent the shrouded return. Such drying/preheat zone may be provided in whole or in part in the shrouded return with a passageway adapted to transfer volatiles from the drying/preheat zone to the conversion zone or fusion zone. The shrouded return may include baffles adapted to direct the flow of gases and improve heat transfer from the gases to the hearth sections The system may include a gasifier adapted to produce syn-gas, and at least one gas passageway capable of directing gases from the linear hearth furnace and/or the shrouded return to the gasifier. Alternatively or in addition, the system may include a scrubber adapted to produce a commercially viable $CO_2$ gas stream and at least one gas passageway capable of directing gases from the linear hearth furnace and/or the shrouded return to the scrubber.

BRIEF DESCRIPTION OF THE DRAWINGS

Presently contemplated embodiments of the present disclosure are described below by reference to the following figures.

DETAILED DESCRIPTION OF THE DRAWINGS

Figure 1:
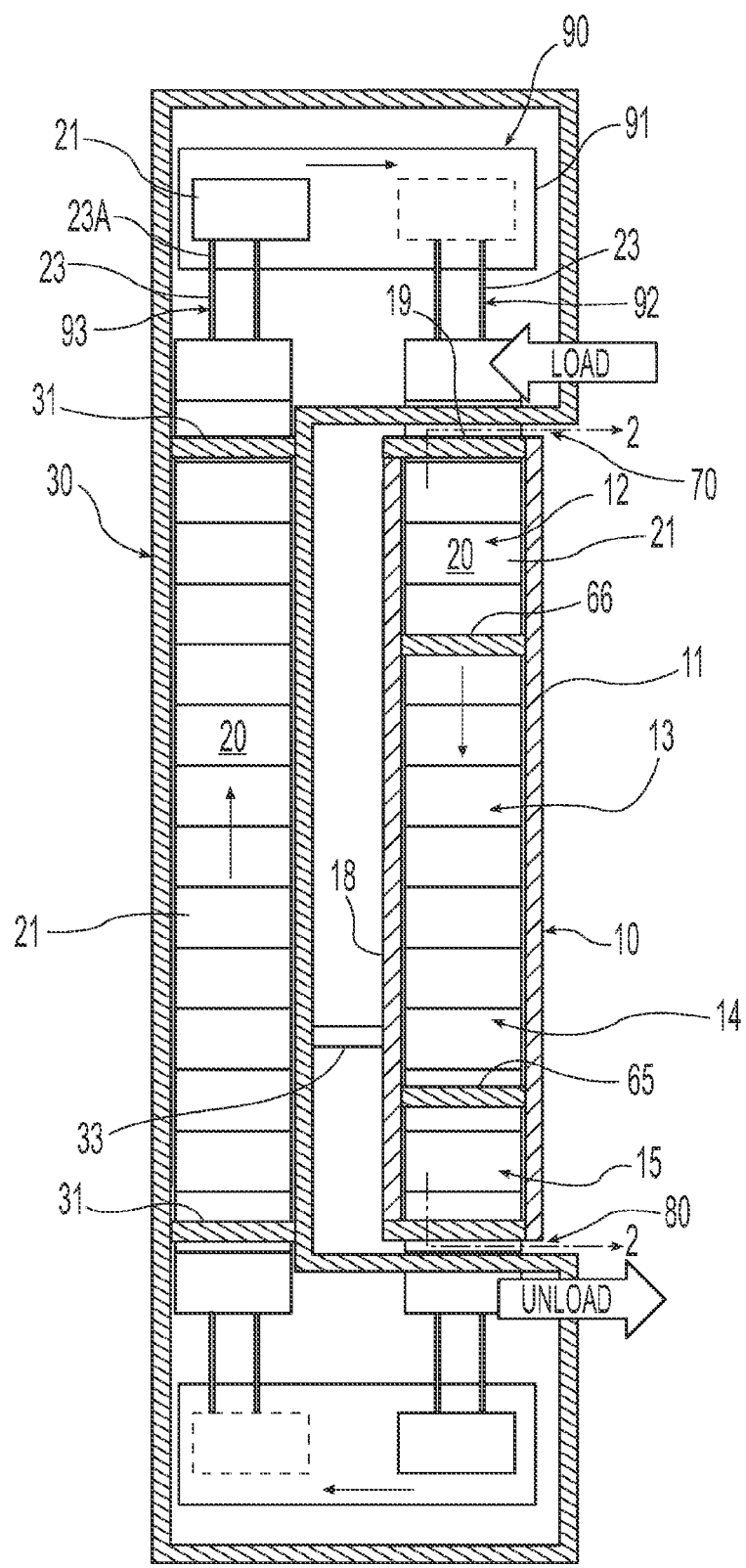
FIG. 1 is a top sectional view of a system for producing metallic iron material with reduced $CO_2$ emissions.

Referring to FIG. 1, a system for making metallic iron nodules with reduced $CO_2$ emissions is illustrated. The system may comprise a hearth furnace 10 having an entry portion 70, an exit portion 80, and a moving hearth 20 adapted to move reducible material through the furnace between the entry portion and the exit portion. The hearth furnace has a conversion zone 13 and a fusion zone 14, as described below. Reducible material, such as iron oxide, may be moved through the hearth furnace 10 on the moving hearth 20. The moving hearth 20 may include hearth sections or cars 21 adapted to move through the furnace on a guide, such as rails, from the entry portion 70 to the exit portion 80. The system also comprises a shrouded return 30 positioned adjacent the linear hearth furnace 10 through which the hearth sections 21 can move from adjacent the exit portion 80 to adjacent the entry portion 70 of the linear hearth furnace. The system for making metallic iron nodules may also comprise at least one gas passageway 33 capable of transferring gases from at least the fusion zone 14 to the shrouded return 30. Alternatively or in addition, the passageway 33 may transfer gases from the conversion zone 13 to the shrouded return 30. The heated gases transferred from the fusion zone 14 and the conversion zone 13 to the shrouded return 30 are used to heat the hearth sections 21 in the shrouded return to improve the energy efficiency of the system. The gases transferred from the fusion zone 14 to the shrouded return 30 may contain $CO_2$, and the shrouded return 30 may be adapted to be substantially free of air ingress.

Figure 2:
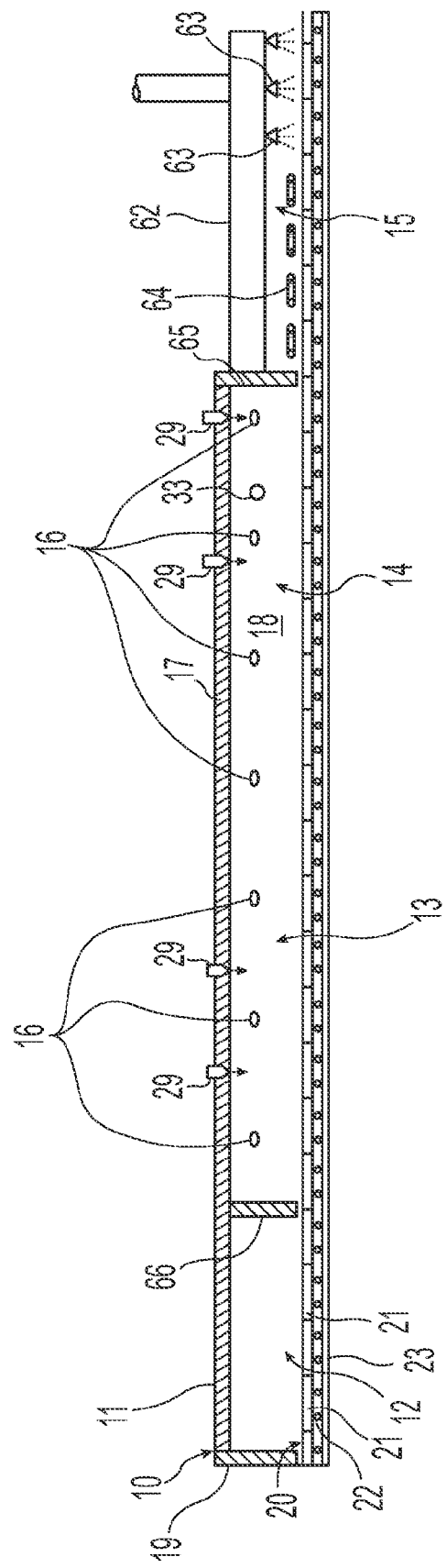
FIG. 2 is an elevational section view showing the hearth furnace of FIG. 1.
Figure 3:
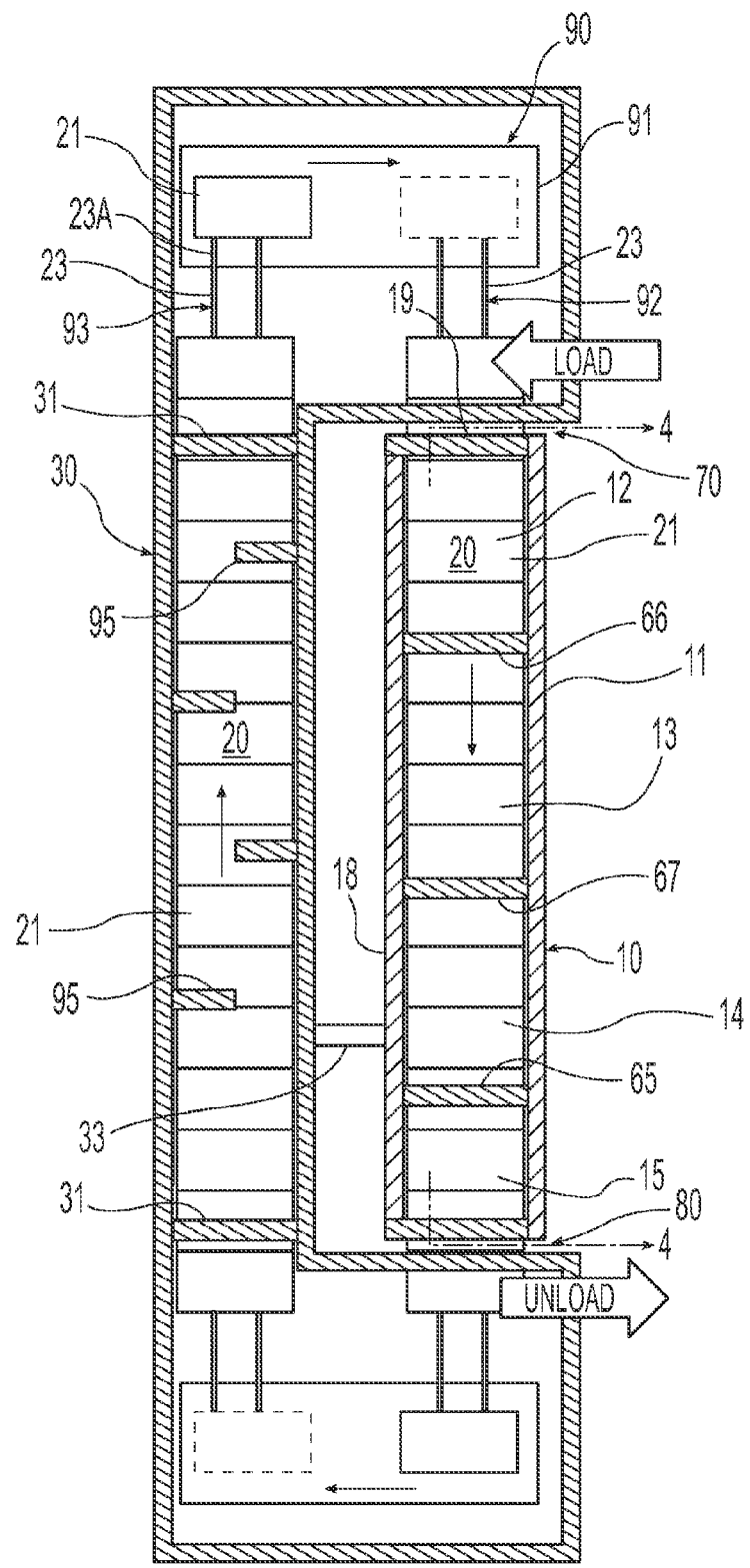
FIG. 3 is a top sectional view of an alternative system for producing metallic iron material with reduced $CO_2$ emissions.
Figure 4:
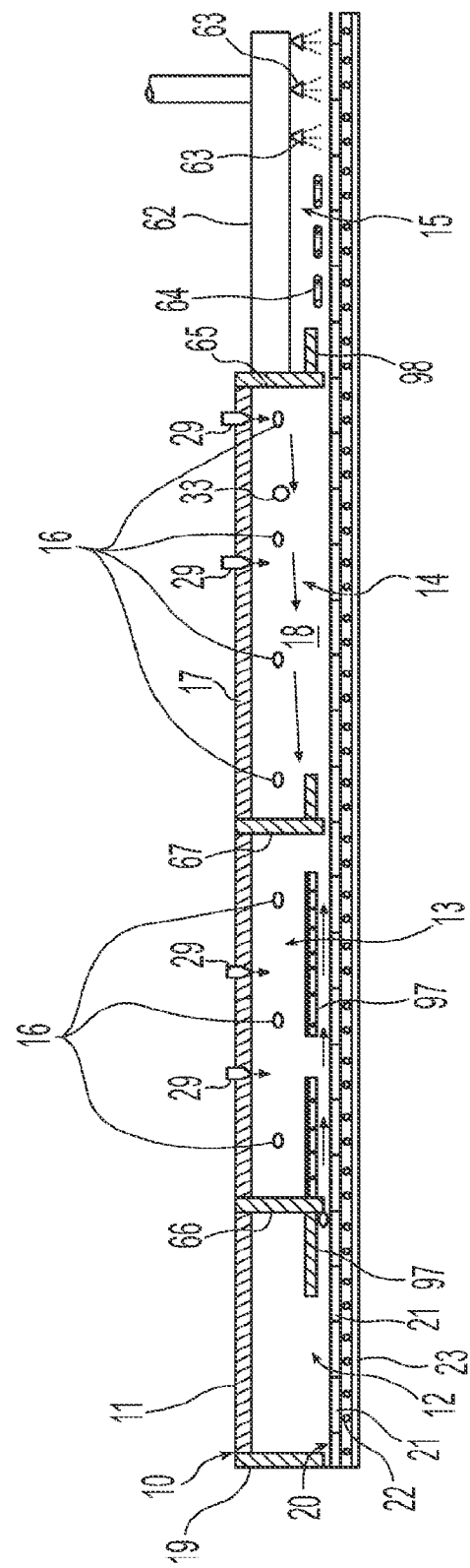
FIG. 4 is an elevational section view showing an alternative hearth furnace of FIG. 3

Referring to FIG. 2, a hearth furnace 10 is shown for producing metallic iron nodules directly from iron ore and other iron oxide sources. The furnace 10 has a furnace housing 11 internally lined with a refractory material suitable to withstand the temperatures involved in the reduction and fusion of reducible material to metallic iron nodules in the furnace. The hearth furnace 10 may have a conversion zone 13 having a reducing atmosphere typically of 1800 to 2350° F. (980 to 1290° C.) to at least partially reduce the reducible material, and a fusion zone 14 having an atmosphere typically of 2400 to 2550° F. (1315 to 1400° C.) to at least partially form metallic iron nodules (NRI). The location of the conversion zone 13 and fusion zone 14 in the hearth furnace 10 may be determined by the temperature of the reducible material on the moving hearth 20 as discussed herein. Alternatively or in addition, the hearth furnace 10 may include a baffle 67 between the conversion zone 13 and the fusion zone 14 as shown in FIGS. 3 and 4. A drying/preheat zone 12 capable of providing a drying/preheating atmosphere for reducible material may be provided in or adjacent the entry portion of the hearth furnace 10, and/or a cooling zone 15 capable of providing a cooling atmosphere for reduced material containing metallic iron material may be provided in or adjacent the exit portion of the furnace. The cooling zone 15 may be positioned within the furnace housing 11. Alternatively, the cooling zone 15 may be positioned outside the furnace housing 11 as shown in FIGS. 2 and 4.

Figure 6:
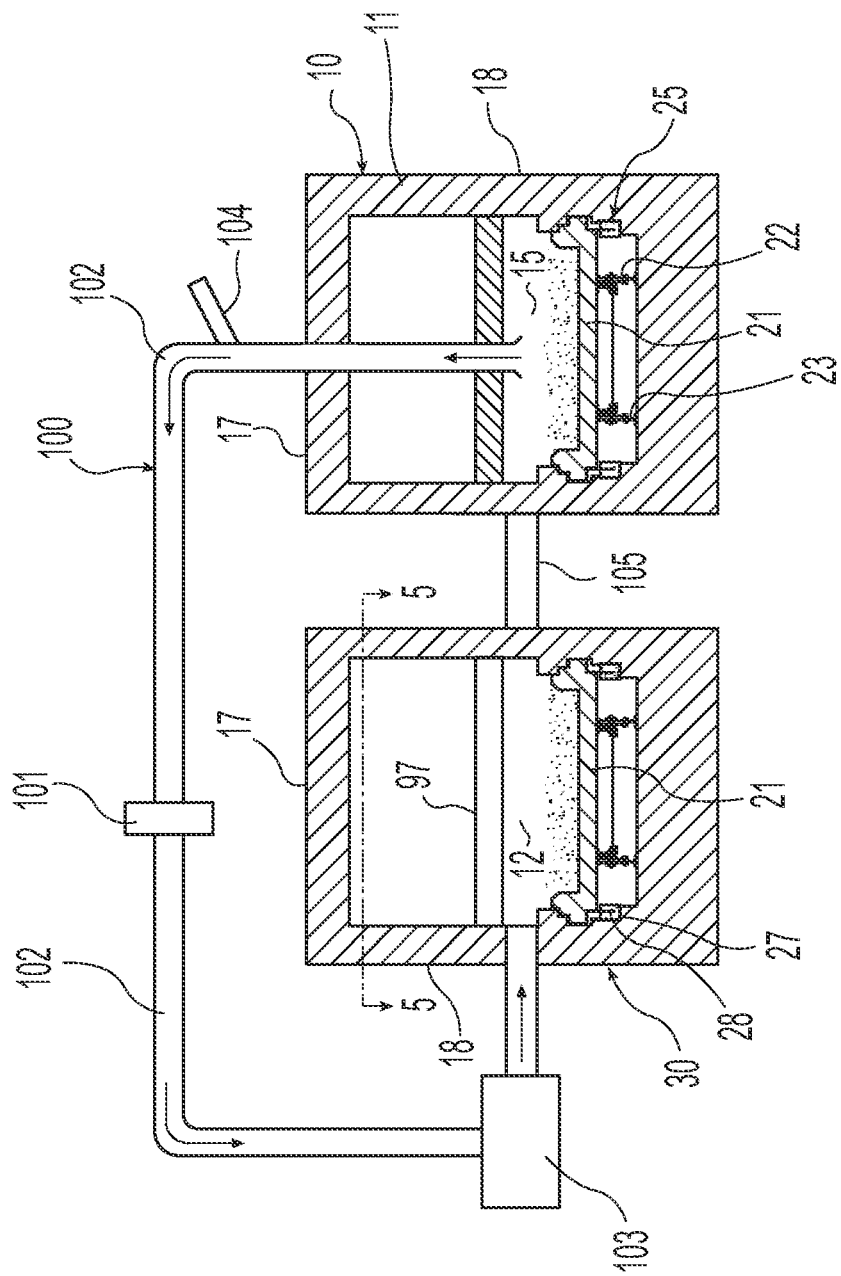
FIG. 6 is a cross-sectional view taken along line 6-6 of FIG. 5.

The moving hearth 20 may be a plurality of removable hearth sections or hearth cars 21. By a suitable drive (not shown), the hearth cars 21 may enter the hearth furnace 10 at the entry portion 70, move through the furnace housing 11, and exit the hearth furnace at the exit portion 80. The hearth cars 21 may be moved along a furnace guide 92 through the furnace. In one embodiment, the hearth cars 21 may have wheels 22, and the furnace guide 92 may be rails 23, as shown in FIG. 2. The upper portion of the hearth cars 21 may be lined with a refractory material suitable to withstand the temperatures for reduction and fusion of the iron oxide bearing material into metallic iron as explained herein. The removable hearth cars 21 may be positioned contiguously end to end to move through the furnace housing 11, with a sand seal 25 positioned along opposite sides of each hearth car 21 to protect the underside of the cars from the reduction and fusion temperatures in operation of the furnace. As shown in FIG. 6, the sand seal 25 comprises a trough 27 containing sand in the furnace housing 11 on opposite sides of each moving hearth 20, and a knife seal 28 extending downwardly from opposite sides of each hearth car 21 to engage the sand in the trough 27 as the hearth car moves through the furnace housing 11. This assembly may be used to protect the lower portions of the furnace housing 11 and the lower portions of the hearth cars 21 from being damaged by the heat generated in the furnace 10. Alternatively, the moving hearth 20 may be a moving belt or other suitable conveyance medium that is able to withstand the high temperatures of the furnace atmospheres as described below.

After exiting the hearth furnace 10 at the exit portion 80, the hearth cars 21 are transferred from the hearth furnace 10 to the shrouded return 30 positioned adjacent at least the conversion and fusion zones of the furnace. The shrouded return 30 may extend substantially the length of the hearth furnace 10. In any event, through which the hearth sections can move through the shrouded return 30 on a guide, such as rails, from adjacent the exit portion 80 to adjacent the entry portion 70. The shrouded return 30 covers and protects the hearth cars 21 as the hearth cars are transported from the exit portion 80 to the entry portion 70 of the hearth furnace 10.

While within the shrouded return 30, the hearth cars 21 are generally heated, or at least the rate of cooling reduced, by transporting heated exhaust gases from at least the fusion zone 14 and/or conversion zone 13 of the hearth furnace 10. Optionally, at least a portion of the flue gas to the shrouded return 30 may also be used to heat the hearth cars 21 in the shrouded return. Upon exiting the cooling zone 15, the hearth cars 21 may be at a temperature of approximately 800-1200° F. (about 425-650° C.). In prior systems, the hearth cars 21 may have cooled to approximately 400° F. (about 200° C.), or below, prior to reentering the hearth furnace 10 at the entry portion. In the system illustrated in FIG. 1, the heated gases transported from the conversion zone 13 and the fusion zone 14 of the hearth furnace may maintain a temperature of approximately 1000-1200° F. (about 535-650° C.) and the hearth cars may be maintained at a temperature of approximately 800-1200° F. (about 425-650° C.), thereby improving the energy efficiency of the system. In an alternative embodiment, the temperature in the shrouded return 30 may be maintained at approximately 400-600° F. (about 200-315° C.).

The shrouded return 30 is generally adapted to inhibit air ingress. The shrouded return 30 may have shroud end baffles 31 that inhibit fluid flow between the outside ambient atmosphere and the atmosphere inside the shrouded return 30. Additionally, the atmosphere in the shrouded return 30 may be maintained at a positive pressure above the pressure of the ambient atmosphere to further inhibit fluid flow from the ambient atmosphere to the shrouded return. By limiting air ingress, and providing a positive gas flow, the shrouded return may maintain the heated gases transferred from the conversion zone 13 and/or fusion zone 14 to the shrouded return to maintain the heat of the hearth cars 21.

The heated gases directed to the shrouded return from the conversion zone and/or the fusion zone may contain carbon dioxide ($CO_2$), and the shrouded return 30 may be adapted to retain and process these $CO_2$ emissions. Alternatively or in addition, at least a portion of flue gas from the hearth furnace 10 may also be directed into the shrouded return 30, and heat from the flue gas may be used to further heat the hearth cars 21 while in the shrouded return 30. The shrouded return 30 may be further adapted to maintain separation between the gases in the shrouded return and the hearth furnace 10, or the exhaust gases from the shrouded return may be mixed with combustible fuel, oxygen, carbon dioxide, flue gas, or combinations thereof and returned to the conversion and/or fusion zones to provide heat to reduce and fuse the reducible material to metallic iron nodules.

Figure 5:
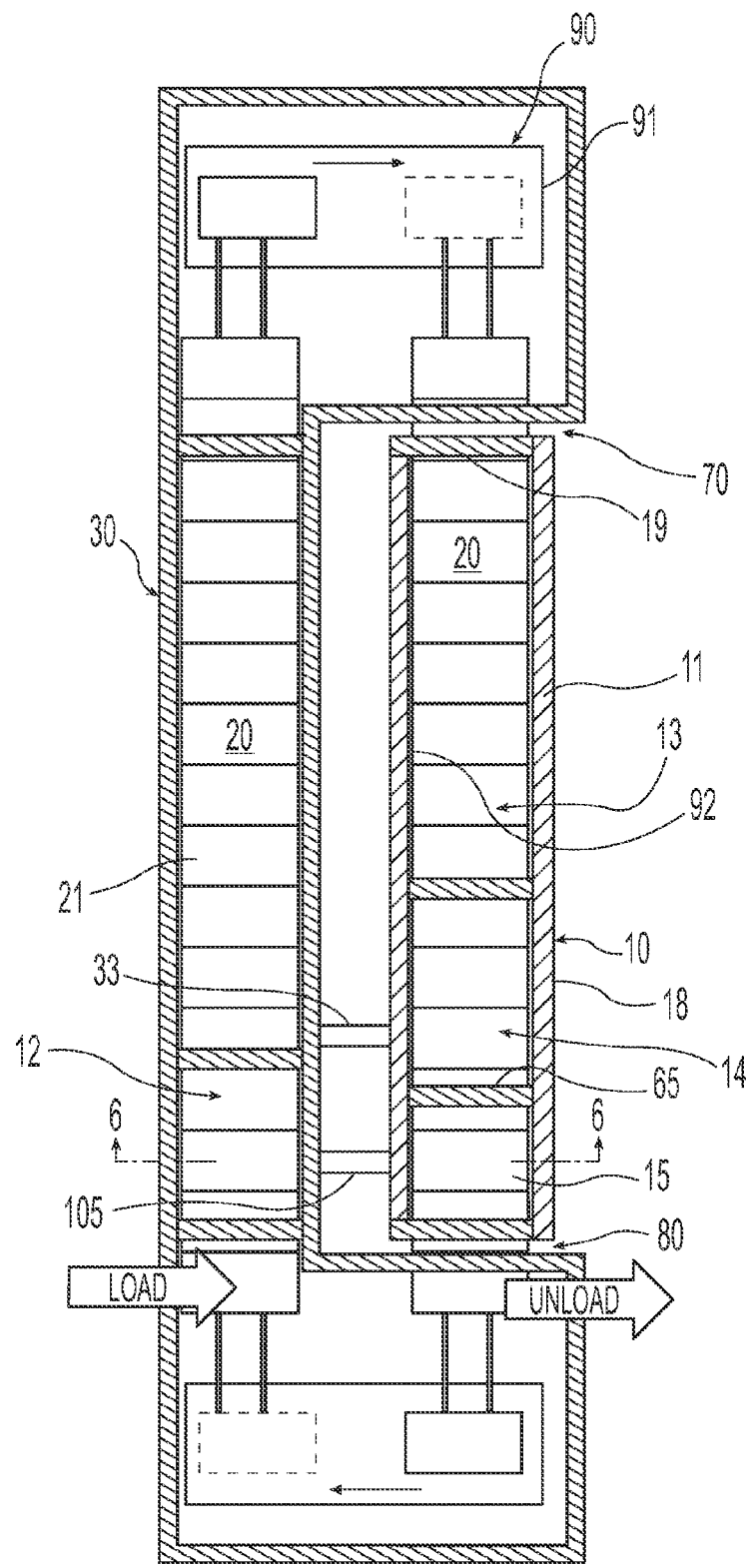
FIG. 5 is a top sectional view of an alternative system for producing metallic iron.
Figure 7:
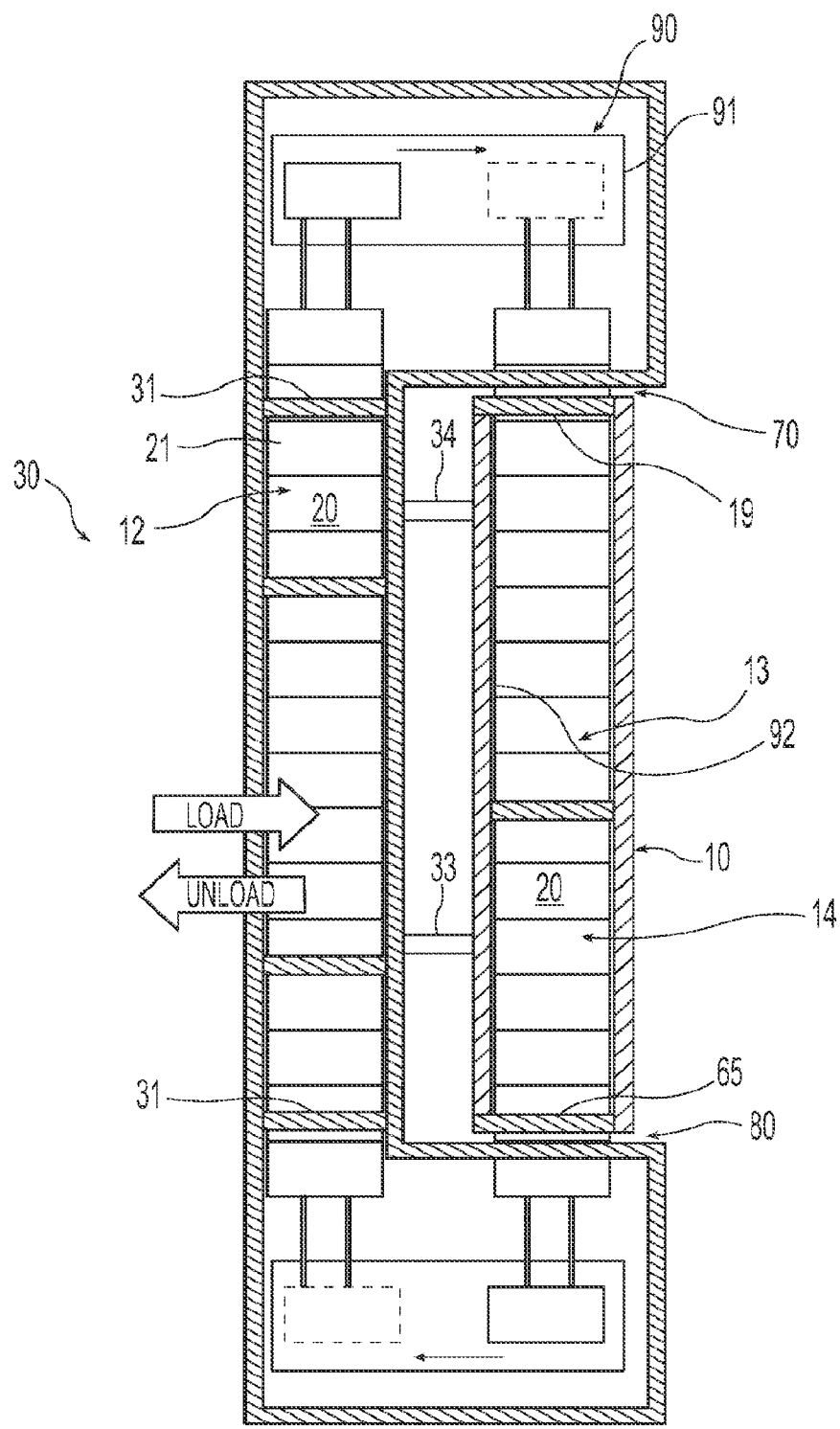
FIG. 7 is a top sectional view of a second alternative system for producing metallic iron.

Referring to FIG. 1, a drying/preheat zone 12 may be positioned in the hearth furnace 10 as illustrated. Alternatively, a drying/preheat zone 12 may be positioned in the shrouded return 30, as illustrated in FIGS. 5 and 7, or adjacent the entry portion of the furnace. In either case, the conversion zone 13 is positioned in sequence between the drying/preheat zone 12 and the fusion zone 14 as discussed below. The entry portion 70 of the hearth furnace 10 may have a restricting baffle 19 that inhibits fluid flow from the outside ambient atmosphere or drying/preheat zone 12 to the atmosphere of the hearth furnace, yet provides clearance so as not to inhibit the movement of reducible material into the furnace housing 11. Where the drying/preheat zone 12 is within the furnace housing 11, a baffle 66 may be positioned between the drying/preheat zone 12 and the conversion zone 13. The pressure of the atmosphere in the hearth furnace 10 is typically maintained above the pressure of the ambient atmosphere to further inhibit fluid flow from the ambient atmosphere to the hearth furnace atmosphere. The method of producing metallic iron nodules includes reducing the reducible material in the hearth furnace 10 to metallic iron nodules substantially free of air ingress from the surrounding environment. The baffles 19, 66 may be made of suitable refractory material or a metal material if the temperatures are sufficiently low.

The moving hearth 20 in furnace housing 11 may be linear as generally shown in FIG. 1. However, the building in which the furnace is housed, or other considerations, may require that certain parts of the furnace be arcuate or at angles, to accommodate these needs. For these purposes, the hearth furnace is classified as linear if a part of its length, usually the conversion zone 13 and/or fusion zone 14, is substantially linear in the direction of travel of the moving hearth 20.

The zones of the furnace system are generally characterized by the temperature reached in each zone and the processing of reducible material in each zone. In the drying/preheat zone 12, moisture is generally driven off from the reducible material and the reducible material is heated to a temperature short of substantial fluidizing of volatiles in and associated with the reducible material positioned on the hearth cars 21. The design is to reach a cut-off temperature in the drying/preheat zone atmosphere where the reducible material is just short of significant volatilization of carbon bearing material in and associated with the reducible material. This temperature is typically in the range of about 200-400° F. (about 90-200° C.), depending in part on the particular composition of the reducible material and the particular composition of the carbonaceous material. When the drying/preheat zone 12 is positioned adjacent the entry portion of the furnace or in the shrouded return 30, the temperature in the shrouded return may also be in the range of about 200-400° F. (about 90-200° C.). Volatiles as produced in the drying/preheat zone 12 in the shrouded return 30, as well as other gases in the shrouded return 30, may be transferred back to the linear hearth furnace 10 through communication passageway 34, as shown in FIG. 5. The volatiles and/or other gases transferred from the shrouded return to the linear hearth furnace 10 may then be combusted within the furnace or mixed with combustion fuels, commercial grade oxygen gas, carbon dioxide, or combinations thereof. A flow of diluted oxygen gas, such as commercial grade oxygen mixed diluted with carbon dioxide or flue gas, may be delivered into the hearth furnace to control flame temperature and heat the furnace to a temperature sufficient to at least partially reduce the reducible material and to increase the mass of the gas delivered to the furnace to improve heat transfer heat through the furnace. The flow of diluted oxygen gas into the conversion zone 13 and the fusion zone 14 may be between about 10% and 40% oxygen gas by volume, and may be between about 15% and 35% oxygen gas by volume. Alternatively the flow of diluted oxygen gas may be between about 25% and 40% oxygen gas by volume. This recycling of volatile emissions, carbon dioxide, and/or flue gas may improve the energy efficiency of the hearth furnace 10 and reduce hydrocarbon emissions thereby reducing costs.

The conversion zone 13 is the zone in which volatiles from the reducible material and carbonaceous reductant, including carbon bearing material, are generally fluidized, as well as the zone in which at least initial reduction of reducible iron oxide material occurs. The conversion zone 13 is characterized by heating the reducible material first to drive off remaining moisture and a majority of the volatiles in the reducible material and carbonaceous material, and at least partially reduce the reducible material. The heating in the conversion zone 13 may initiate the reduction reaction in forming the reducible material into metallic iron nodules and slag. The conversion zone 13 is generally characterized by heating the reducible material to about 1800 to 2350° F. (about 980 to 1290° C.), depending on the particular composition and form of reducible material of the particular embodiment. Optionally, a horizontal baffle 97 may be positioned above the moving hearth 20 in the conversion zone 13 to provide an atmosphere directly above the moving hearth separate from the upper portion of the conversion zone and direct fluid flow above and below the horizontal baffle as shown in FIG. 4.

The fusion zone 14 involves further heating the reducible material, now absent a majority of volatile materials and commencing reduction of reducible iron oxide, to fuse into metallic iron nodules (NRI) and slag. The fusion zone generally involves heating the reducible material to about 2400 to 2550° F. (about 1315-1400° C.), or higher, so that metallic iron nodules are formed with only a low percentage of iron oxide in the metallic iron. If the process is carried out efficiently, there will also be a low percentage of iron oxide in the slag, since the process is designed to reduce a very high percentage of the iron oxide in the reducible material to metallic iron nodules (NRI). Additional details of the features and operation of a hearth furnace are disclosed in U.S. App. Ser. No. 60/866,237, filed Nov. 17, 2006, and are incorporated herein by reference.

When the moving hearth 20 exits the fusion zone 14 of the furnace 10, the sections or cars of the moving hearth then enter the cooling zone 15. The metallic iron material may be cooled in the cooling zone 15 from its formation temperature in the conversion zone 13 and fusion zone 14 to a temperature at which the metallic iron nodules can be reasonably handled and further processed. This temperature is generally below 800° F. (about 425° C.) and may be below about 550° F. (about 290° C.). Alternatively, the temperature of the material on the moving hearth 20 after the cooling zone 15 may be between about 300 to 600° F. (about 150-315° C.). The cooling can be achieved by injection of nitrogen through nozzles (not shown) in the roofs and/or side walls of the furnace housing or external the furnace housing. As to the latter, water spray 63 may be used external the furnace housing for the cooling in the cooling zone 15, if desired and provision made for water handling within the system. Alternatively or additionally, adjacent the furnace housing, a system of coolant tubes 64 may be positioned over the moving hearth 20 as shown in FIGS. 2 and 4. A vent hood 62 may be positioned above the moving hearth 20 to remove evaporated water and other fluidized materials that come off of the hearth during the spray cooling. Optionally, a horizontal baffle 98 may also be positioned above the moving hearth 20 in the cooling zone 15 to inhibit fluid flow between the fusion zone 14 and the cooling zone as shown in FIG. 4.

During operation of the hearth furnace 10 various gases including $CO_2$ may be produced from combustion in the conversion zone 13 and/or the fusion zone 14. The method of making metallic iron nodules may also comprise directing these heated gases from at least the fusion zone 14 to the shrouded return 30 to heat the hearth sections 21 in the shrouded return. Alternatively or in addition, at least a portion of the flue gas from the furnace 10 may be directed into the shrouded return 30. We have found that the flue gas may contain about 40% $CO_2$, about 42% $H_2O$, about 10% CO, about 5% $H_2$, and the balance other constituents such as nitrogen, methane, and other gases.

At least a portion of the gases from the furnace 10 may be transported through a gas passageway 33 extending between the hearth furnace 10 and the shrouded return 30. The gas passageway 33 may comprise a chamber or chambers extending between the fusion zone 14 and the shrouded return 30. Alternatively or in addition, the gas passageway 33 may comprise ducting. To accommodate the heated gases from the fusion zone 14, the gas passageway 33 may be constructed from refractory materials. A damper (not shown) may be positioned within or adjacent the gas passageway 33 to control or limit the flow of gases between the hearth furnace 10 and the shrouded return 30. Additionally, one or more heat exchangers may be positioned in the gas passageway 33 to recover heat from the heated gases prior to entering the shrouded return 30. In one example, gases may be heated for use in a drying/preheat zone 12, or other heat recovery as discussed below. For example, a flow of carbon dioxide may be used to recover waste heat from the system. The flue gas may be processed to separate a stream of carbon dioxide The carbon dioxide may be heated by the hot flue gas through a heat exchanger. The carbon dioxide may be preheated to about 750° F. (about 400° C.) in the heat exchanger. Alternatively, the carbon dioxide may be preheated to between about 400° F. (about 200° C.) and 1500° F. (about 810° C.). The carbon dioxide may be mixed with oxygen and delivered to the furnace and/or the shrouded return 30 for heat recovery and to regulate flame temperatures as desired.

Figure 9:
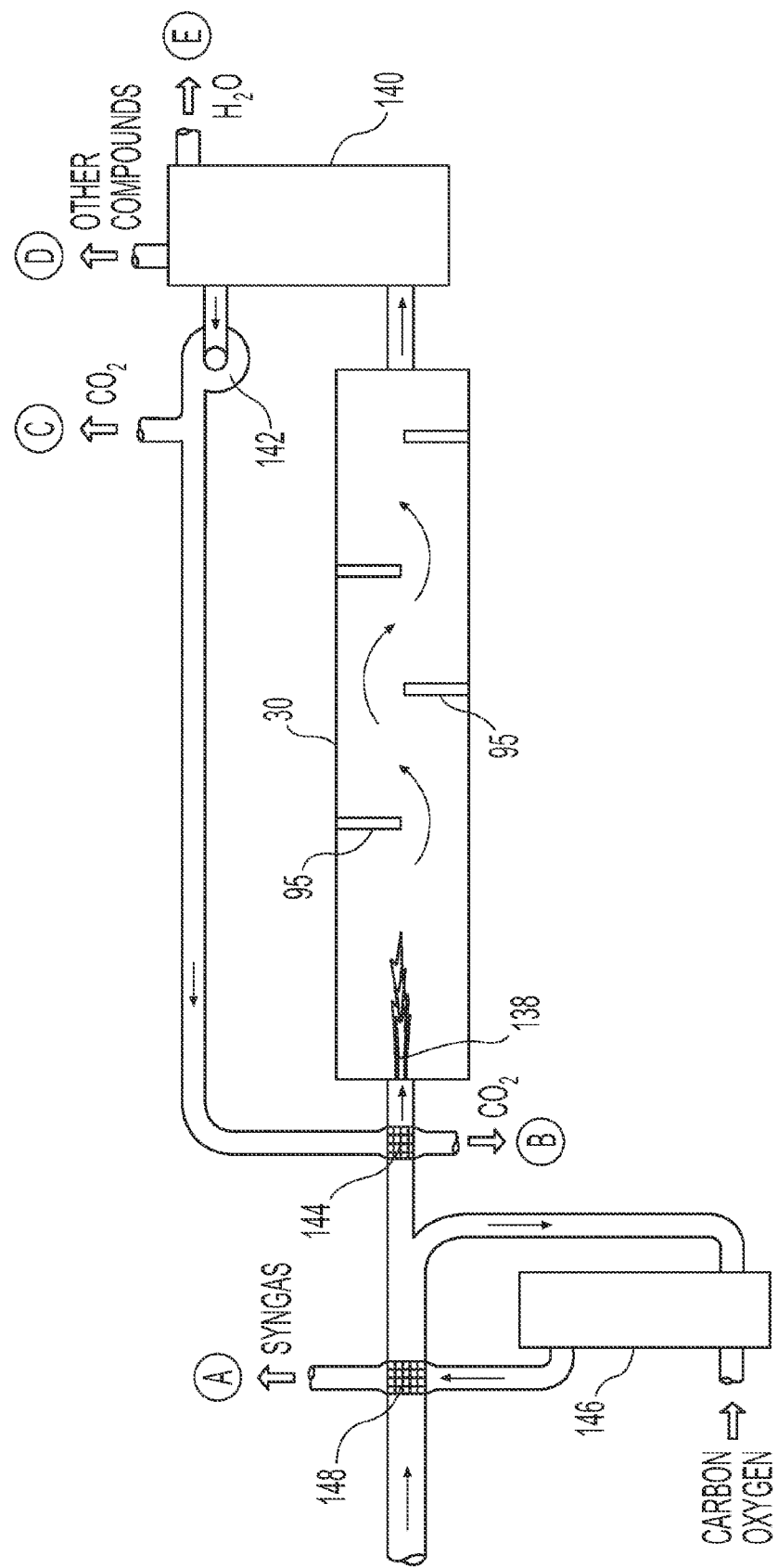
FIG. 9 is a schematic flow diagram of a $CO_2$ and heat recovery system for use with the present hearth furnace system.

The shrouded return 30 may be heated to between about 1000° F. and 2000° F. (between about 540° C. and 1090° C.) to maintain the moving hearth at a desired temperature. The shrouded return 30 may be lined with refractory brick or other refractory material selected for the desired temperatures in the shrouded return. Optionally, a plurality of baffles 95 may be provided in the shrouded return 30 above the hearth arranged as desired adapted to direct the flow of gases and improve heat transfer from the gases to heat the hearth sections, such as shown in FIGS. 3 and 9.

The shrouded return 30 may be adapted to inhibit air ingress by maintaining a pressure higher than atmospheric pressure to avoid mixing of the heated gases with ambient atmosphere. A thermal oxidizer 138 such as a burner may be provided to process the gases entering the shrouded return. The thermal oxidizer may be positioned above the moving hearth 20 adjacent or within the entry of the shrouded return 30. Alternatively, the thermal oxidizer 138 may be operatively positioned in the gas passageway 33. The thermal oxidizer may be useful in reducing the concentration of CO and $H_2$ in the gas stream by producing $CO_2$ and $H_2O$. Additionally, the thermal oxidizer 138 may provide a pressure differential sufficient to move the gas stream through the shrouded return 30.

The shrouded return 30 may be configured such that the hearth cars 21 are positioned contiguously end to end to move through the shrouded return 30 with the sand seal 25 positioned along opposite sides of each hearth car 21 along the shrouded return 30. The construction of the sand seal 25 may be substantially similar to the sand seal 25 used in the hearth furnace 10. This assembly is to protect the lower portions of the shrouded return and the lower portions of the hearth cars 21 from the heat in the shrouded return.

The heated gases transported from the hearth furnace 10 to the shrouded return may be used to heat the hearth sections 21 in the shrouded return. Alternatively or in addition, the heated gases may be used to dry or preheat the charge for the hearth furnace. Additionally, to reduce carbon dioxide emissions, the shrouded return 30 may be utilized in a process to sequester $CO_2$. The gases produced in the hearth furnace 10 and transported to the shrouded return 30 contain carbon dioxide. To reduce carbon dioxide emissions, the gases from the shrouded return 30 may be processed to remove $CO_2$. It may be useful to recover heat from the flue gas stream before capturing the $CO_2$ for processing. Numerous techniques are known for filtering and compressing $CO_2$ emissions and may be employed with the shrouded return 30. For example, a $CO_2$ scrubber may be positioned adjacent or within the shrouded return 30 to separate the $CO_2$ from other gases and particulate matter. The flue gas from the furnace may be directed through the shrouded return and into a scrubber 140. The $CO_2$ scrubber may utilize techniques known to those of ordinary skill in the art, such as adsorption, amine extraction, or a reverse heat exchanger. Additional techniques are known for filtering $CO_2$ from stationary exhaust sources and are contemplated for use with the present invention. The $CO_2$ may also be at least partially used to dilute the oxygen gas, delivered to the conversion and/or fusion zones of the furnace to heat the reducible material and reduce and fuse the same to metallic iron nodules (NRI).

As shown in FIG. 9, the flue gas may be directed into the shrouded return 30 and processed by a thermal oxidizer 138. The flue gas may enter the shrouded return at a temperature greater than 2000° F. (about 1090° C.). Alternatively, the flue gas entering the shrouded return may be greater than 2400° F. (about 1315° C.). The gases exiting the shrouded return may be directed to the scrubber 140 for processing. As sulfur-containing and halogen containing compounds are not desirable in the gas stream, these compounds may also be removed from the gas stream. The gas stream may be treated using lime and/or limestone, which may react with sulfur dioxide present in the gas stream to form calcium sulfate dehydrate ($CaSO_4.2H_2O$), also known as gypsum. Additionally, the gas stream may be cooled to condense and remove water. The impurities and/or water may exit the scrubber 140 at locations D and E as shown in FIG. 9. The remaining gas stream contains a high concentration of $CO_2$, and may exit the scrubber 140 between about 100° F. and 500° F. (between about 40° C. and 260° C.). A fan or blower 142 may be provided to convey the $CO_2$ as desired.

Oxygen ($O_2$) gas, such as commercially available oxygen may be supplied along with combustion fuels to the linear hearth furnace 10, optionally diluted with $CO_2$, to produce a flue gas that can be cleaned to produce a $CO_2$ gas stream. The oxygen gas may be pure oxygen, which for purposes of this disclosure, includes commercially available oxygen gas having a concentration of at least 95% oxygen. In this respect, commercially available $O_2$ gas refers to oxygen gas that may be delivered to the hearth furnace 10 for combustion. The $O_2$ gas may be commercially available in either a gas or liquid state, and may be compressed. Additionally, the hearth furnace 10 may be adapted to be substantially free from air ingress to maintain desired atmosphere and oxygen content within to the furnace. Air ingress may also be inhibited to reduce the introduction of other undesired gases such as nitrogen into the atmosphere in the furnace 10.

By supplying commercially available $O_2$ and reducing air ingress, the flue gas from the hearth furnace may be tailored such that the flue gas can be cleaned in the scrubber 140 to produce a commercially viable $CO_2$ gas stream. A commercially viable $CO_2$ gas stream may be a concentrated $CO_2$ gas stream, for example greater than 90% or 95% $CO_2$ by weight. The flue gas may have other components such as water vapor and/or other exhaust gases and particulate emissions. In this respect, cleaning of the gas stream may entail condensing water vapor out of the emissions. Other impurities, such as sulfur-containing and/or halogen-containing compounds, may also be condensed or filtered from the emissions. After removing water vapor and other impurities, the $CO_2$ gas stream may be suitable for subsequent processing such as carbon sequestration and may exit the scrubber 140 at location C as shown in FIG. 9. In one embodiment, a majority of the $CO_2$ gas stream is directed to carbon sequestration while a minority is retained for use in the hearth furnace system.

The $CO_2$ may be utilized as desired. The $CO_2$ gas stream may be condensed into a liquid, precipitated into a carbonate, or transferred to a pipeline for storage, sale, or other disposal, such as processes for enhancing oil recovery or recovering methane gas from coal seams. In one example, a reverse heat exchanger may be employed to cool the $CO_2$ into a liquid for transmission to a pipeline. In another alternative, the carbon dioxide may be injected into geological formations such as gas fields, saline formations, unminable coal seams, and saline-filled basalt formations. In this method, known as sequestration, the carbon dioxide can be chemically reacted to produce stable carbonates, thereby reducing the amount of carbon dioxide emitted into the atmosphere from production of metallic iron nodules. In one embodiment, a majority of the $CO_2$ gas stream is directed to sequestration, while a minority is retained for use in the hearth furnace system.

Alternatively, the $CO_2$ may be mixed with oxygen for use in the oxy-fuel burners 16 heating the furnace 10. The flame temperature and/or flame stability through the oxy-burners may be regulated by mixing a desired amount of $CO_2$ with the oxygen to maintain a desired flame temperature. Additionally, the $CO_2$ has more mass than oxygen alone to more efficiently transfer heat within the furnace. Alternatively or in addition, the $CO_2$ may be directed through the heat exchanger 144 to recover heat from the flue gas prior to the flue gas entering the shrouded return 30. The heated $CO_2$ may be directed into the furnace 10, for example from location B in FIG. 9, such as to heat the drying or preheat zones. Using these techniques, the emission of $CO_2$ gas into the ambient atmosphere may be reduced. These subsequent processes may produce additional value to partially offset the cost of capturing the $CO_2$ emissions.

The $CO_2$ recovery may be further improved by processing the flue gas within the shrouded return 30. As described above, oxygen may be introduced to the shrouded return to oxidize CO and $H_2$ and other impurities in the gas stream. By processing the gas stream within the shrouded return 30 adapted to inhibit air ingress, the amount of carbon dioxide gas released into the ambient environment may be substantially reduced. This reduction in $CO_2$ emissions is a further benefit of the present invention.

A method of production of metallic iron nodules may also include delivering oxygen gas into the hearth furnace in the conversion and fusion zones to at a ratio of at least 0.7:1 pounds of oxygen to pounds of iron in the reducible iron bearing material to heat the conversion zone to a temperature sufficient to at least partially reduce the reducible material and to heat the fusion zone to a temperature sufficient to at least partially reduce the reducible material. As used herein, the ratio of pounds of oxygen gas to pounds of iron in the reducible iron bearing material is based on the overall amount of oxygen gas delivered to the conversion and fusion zones of the furnace, and the ratio of pounds of oxygen gas to pounds of iron in the reducible material may be more or less than the overall ratio in any particular location along the length of the conversion and fusion zones of the furnace as described below.

Alternatively, the ratio of pounds of oxygen to pounds of iron in the reducible material may be at least 0:8:1, at least 0.9:1, at least 1:1, at least 1.2:1, at least 1.5:1, or at least 1.7:1 based on oxygen delivered to the conversion and fusion zones of the furnace. The oxygen gas may be delivered to the conversion zone and the fusion zone through one or more oxygen lances or oxy-burners. The oxygen gas may be delivered through oxygen lances from a position less than 18 inches from the top of the interior of the hearth furnace and alternately or in addition through the oxy-burners positioned in the walls of the furnace housing in the conversion zone and the fusion zone. Note the oxygen gas may also be delivered during start up to assist in heating the zones of the furnace to desired temperatures to reduce the reducible material in the furnace and produce metallic iron nodules. In some embodiments, once the rate of oxygen gas delivery is sufficient to maintain the desired temperature through combustion of the evolved volatiles, carbonaceous material from the furnace charge, and reductant gases delivered to the furnace, the delivery of the combustible fuels through the oxy-fuel burners may be substantially reduced and may be shut off to avoid fuel usage and more efficiently operate the furnace to produce metallic iron nodules in accordance with the present method.

A carrier gas may also be delivered with the oxygen into the hearth furnace. The carrier gas may be $CO_2$. CO, flue gas or other combustible or non-combustible gas. Delivery of the carrier gas along with the delivered oxygen may reduce the flame temperature reducing wear on the refractory components of the hearth furnace. Additionally, delivery of carrier gas may increase the aggregate mass of gases supplied to the furnace thereby improving heat transfer through the furnace. In another embodiment, nitrogen gas ($N_2$) may be used as the carrier gas, however, removing nitrogen from the exhaust gas may increase the cost of collecting $CO_2$ for sequestration.

Alternately or in addition, at least a portion of the flue gas may be directed into a gasifier 146. The gasifier 146 may be utilized to process carbon-containing materials such as by-products from the iron reduction process, including ash, char and coal powders, slag, and other waste materials. The flue gas may be processed in the gasifier 146 with injected oxygen and carbon-containing materials to produce a mixture of CO and $H_2$, or syn-gas. The syn-gas stream, shown as A in FIG. 9, may be heated in a heat exchanger 148 and then directed into the furnace 10 as a reductant and as a fuel. At least a portion of the flue gas may be directed through the heat exchanger 148 to transfer heat from the flue gas stream into the syn-gas stream. The syn-gas may be preheated to about 1000° F. (about 540° C.) in the heat exchanger 148. Alternately, the syn-gas may be preheated to between about 400° F. (about 200° C.) and 1200° F. (about 650° C.) in the heat exchanger 148. In yet another alternative, the gasifier may produce a syn-gas stream at a temperature sufficiently elevated that pre-heating is not needed, such as up to 1650° F. or higher. By processing waste materials the gasifier 146 may further improve the overall efficiency of the method of producing metallic iron.

During operation of the hearth furnace 10, reducible material may be positioned on the hearth cars 21 by a charging system (not shown) generally in the form of a mixture of finely divided iron ore, or other iron oxide bearing material, and a carbonaceous material. A hearth layer is provided on the hearth that includes at least one carbonaceous material. The carbonaceous material may be any carbon bearing material suitable for use as a reductant with the iron-bearing material. The hearth material layer includes coke, char, other carbonaceous material, or mixtures thereof. For example, anthracite coal, bituminous coal, sub-bituminous coal, coke, coke breeze, or char materials may be used for the hearth material layer. We have found that certain bituminous and sub-bituminous (e.g. Jim Walter Coal and Powder River Basin) coals may be used in mixtures with anthracite coal, coke, coke breeze, graphite, or char materials.

The hearth material layer may comprise a mixture of finely divided coal and a material selected from the group of coke, char, and other carbonaceous material found to be beneficial to increase the efficiency of iron reduction. The coal particles may be a mixture of different coals such as non-coking coal, non-caking coal, sub-bituminous coal, or lignite. The hearth material layer may, for example, include Powder River Basin ("PRB") coal and/or char. Additionally, although up to one hundred percent coal is contemplated for use as a hearth material layer, in some embodiments the finely divided coal may comprise up to twenty-five percent (25%) and may be mixed with coke, char, anthracite coal, or other low-volatile carbonaceous material or mixtures thereof. In other embodiments, up to fifty percent (50%) of the hearth material layer may comprise coal, or up to seventy-five percent (75%) of the hearth material layer may comprise coal, with the remaining portion coke, char, other low-volatile carbonaceous materials, or mixtures thereof. The balance will usually be determined by the amount of volatiles desired in the reduction process and the furnace.

Using coal in the hearth material layer provides volatiles to the furnace to be combusted providing heat for the process. The volatiles can be directly burned near the location of their volatilization from the coal, or may be communicated to a different location in the furnace to be burned at a more desirable location. Regardless of the location in the hearth furnace, the volatiles can be consumed to at least partially heat the reducible material. The carbonaceous material in the hearth layer also may provide a reductant source for reducing the iron bearing material in the furnace while still protecting the hearth refractories.

The hearth material layer is of a thickness sufficient to prevent slag from penetrating the hearth material layer and contacting the refractory material of the hearth 20. For example, the carbonaceous material may be ground or pulverized to an extent such that it is fine enough to prevent the slag from such penetration, but typically not so fine as to create excess ash. As recognized by one skilled in the art, contact of slag with the hearth 20 during the reduction process may produce undesirable damage to the refractory material of hearth 20. A suitable particle size for the carbonaceous material of the hearth layer is less than 4 mesh and desirably between 4 and 100 mesh, with a reasonable hearth layer thickness about ½ inch or more effective protection for the hearth 20 from penetration of the slag and metallic iron during processing. Carbonaceous material less than 100 mesh may be avoided because it is generally high in ash, and resulting in entrained dust that is difficult to handle in commercial operations. The mesh sizes of the discrete particles is measured by Tyler Mesh Size for the measurements given herein.

The reducible material is positioned over the hearth cars 21 above at least a portion of the hearth material layer, typically prior to entering the furnace. The reducible material is generally in the form of a mixture of finely divided iron ore, or other iron oxide bearing material, and a reducing carbonaceous material such as coke, char, anthracite coal, or non-caking bituminous and sub-bituminous coal. The reducible material is in mixtures of finely divided iron bearing material that are formed into compacts. The compacts may be briquettes, balls, or mounds preformed or formed in situ on the heath cars so that the mixtures of reducible material are presented to the furnace 10 in discrete portions After the materials are placed on each removable hearth section or car 21, the removable hearth sections 21 may be pushed into and through moving hearth 20 by pushers (not shown) at the entry portion 70.

The iron-bearing material may include any material capable of being formed into metallic iron nodules for producing metallic iron nodules. The reducible iron bearing material may contain at least a material selected from the group consisting of mill scale, magnetite, hematite, and combinations thereof. For example, the iron-bearing material may include iron oxide material, iron ore concentrate, taconite pellets, recyclable iron-bearing material, pellet plant wastes and pellet screened fines. Further, such pellet plant wastes and pellet screened fines may include a substantial quantity of hematite. In addition, such iron-bearing material may include magnetite concentrates, oxidized iron ores, steel plant wastes, red mud from bauxite processing, titanium-bearing iron sands and ilmenites, manganiferous iron ores, alumina plant wastes, or nickel-bearing oxidic iron ores. Also, less expensive iron ores high in silica may be used. Other reducible iron bearing materials may also be used for making the reducible material for producing metallic iron nodules used in the processes described herein to produce metallic iron nodules. For example, nickel-bearing laterites and garnierite ores for fenonickel nodules, or titanium bearing iron oxides such as ilmenite that can be made into metallic titanium iron nodules (while producing a titania rich slag).

The iron-bearing material may include recycled micro metallic iron nodules formed in the process of producing metallic iron nodules. Micro metallic iron nodules (called micro-nodules or micro-nuggets) include small particles of agglomerated iron having a size between about 20 mesh and about 3 mesh. Metallic iron nodules less than 20 mesh can also be used depending on the availability of separation and handling systems to recycle micro nodules.

In one alternative, the reducible material may contain mill scale containing more than 55% by weight FeO and FeO equivalent, such as disclosed in U.S. Provisional Patent Application 61/146,455 filed Jan. 22, 2009, incorporated herein by reference.

The iron-bearing material may be finely-ground or otherwise physically reduced in particle size. The particle size of the mill scale or mixture of mill scale and similar metallurgical waste may be at least 80% less than 10 mesh. Alternatively, the iron-bearing metallurgical waste may be of a particle size of at least 80% less than 14 mesh. In one alternative, the iron-bearing material may be ground to less than 65 mesh (i.e., −65 mesh) or less than 100 mesh (i.e., −100 mesh) in size for processing according to the disclosed method of making metallic iron nodules. Larger size particles, however, of iron-bearing material may also be used. For example, pellet screened fines and pellet plant wastes are generally approximately 3 mesh (about 0.25 inches) in average size. Such material may be used directly, or may be reduced in particle size to increase surface contact of carbonaceous reductant with the iron bearing material during processing. A smaller particle size tends to reduce fusion time in the present method.

Various carbonaceous materials may be used in providing the reducible material of reducing material and reducible iron-bearing material. The reducing material may contain at least a material selected from the group consisting of, anthracite coal, coke, char, bituminous coal and sub-bituminous coal such as Jim Walter coal and Powdered River Basin coal, or combinations thereof. For example, eastern anthracite and bituminous non-caking coals may be used as the carbonaceous reductant in at least one embodiment. However, sub-bituminous non-caking coal may also be used, such as PRB coal. Sub-bituminous coal may be useful in some geographical regions, such as on the Iron Range in northern Minnesota, as such coals are more readily accessible with the rail transportation systems already in place and in some cases are lower in cost and lower in sulfur levels. As such, western sub-bituminous coals may be used in one or more embodiments of the present method as described herein. Alternatively, or in addition, the sub-bituminous coals may be carbonized, such as up to about 900° C., prior to its use. Other coals may be provided, such as low sulfur bituminous coal from Elkhorn seams from eastern Kentucky, as described below. In any case, the carbonaceous material in the reducible material may contain an amount of sulfur in a range from about 0.2% to about 1.5%, and more typically, in the range of 0.5% to 0.8%.

The amount of reducing material in the mixture with iron bearing material to form the reducible material will depend on the stoichiometric quantity necessary for complete metallic reduction of the iron in the reducing reaction in the furnace. Such a quantity may vary depending upon the percentage of iron in the iron-bearing material, the reducing material and the furnace used, as well as the furnace atmosphere in which the reducing reaction takes place. In some embodiments, where the iron bearing material is hematite or magnetite or mixtures thereof, the carbonaceous material in the reducible material may be between 70 and 90% of the stoichiometric amount to complete reduction of the iron in the iron-bearing material. Where the iron bearing material in the reducible material is mill scale or the like with high levels of FeO, the reducible material may include an amount of carbonaceous material that is between 80 and 110% of the stoichiometric amount needed to reduce the iron-bearing material to metallic iron. In other alternative embodiments where mill scale or the like is used for the iron bearing material, the quantity of reducing material necessary to carry out the reduction of the iron-bearing material is between about 85 percent and 105 percent of the stoichiometric quantity of reducing material needed for carrying out the reduction to metallize the iron, and may be between 90 percent and 100 percent.

In an alternative embodiment of the present method, a layer containing coarse carbonaceous material may also be provided over at least some of the discrete portions of the reducible material. The coarse carbonaceous material of the overlayer may have an average particle size greater than an average particle size of the hearth layer carbonaceous material. In addition or alternatively, the overlayer of coarse carbonaceous material may include discrete particles having a size greater than about 4 mesh or about 6 mesh, and in some embodiments, the overlayer of coarse carbonaceous material may have discrete particles with a size between about 4 mesh or 6 mesh and about ½ inch (about 12.7 mm) There may be of course some particles in the coarse carbonaceous material less than 4 mesh or 6 mesh in size in commercially made products, but the substantial majority of the discrete particles will be greater than 4 mesh or 6 mesh where a coarse carbonaceous material of particle size greater than 4 mesh or 6 mesh is desired. Finer particles of carbonaceous material that may be present in some commercially available compositions may be used but less desired. The coarse carbonaceous material may be selected from the group consisting of anthracite coal, bituminous coal, sub-bituminous coal such as PRB coal, coke, char, and mixtures of two or more thereof. The overlayer of coarse carbonaceous material may be provided over at least a portion of the layer of reducible material either before introduction into the furnace as described in PCT/US2007/074471, filed Jul. 26, 2007, or adjacent introduction of the heated reducible material to the fusion zone as described in Ser. No. 12/569,176, filed on Sep. 29, 2009, with this application.

After each removable hearth section 21 exits the moving hearth 20 at the exit portion 80, at least a portion of the contents of the removable hearth section 21 are removed by any suitable discharge system, such as a magnetic separator, conveyor, or other discharge system (not shown). It may be beneficial to keep all or part of the hearth layer on the hearth section or hearth car 21, to facilitate recharging the hearth section 21 for reentry into the furnace 10. The removed material may be transferred to a classifier system (not shown) that classifies the removed material by at least one of size, weight and density into reduced iron nodules, coarse carbon bearing material (e.g., +6 mesh), slag, and fine carbon bearing material (e.g., −6 mesh). The classified carbon bearing material may then be transferred back for re-use by the charging system for the hearth layer or overlayer charged on the removable hearth section 21. The reduced iron nodules are removed as product, and the slag may be removed as a waste product. In any case, a charging system, such as a conveyor may refill the removable hearth sections 21 with at least one layer of the mixture of iron oxide and carbon bearing material and the overlayer of carbon bearing material as described above.

The discharging and charging of the hearth sections may occur in various locations within the contemplated systems. For example, the hearth cars 21 may be discharged either after exiting the cooling zone (as shown in FIG. 1), within the shrouded return (as shown in FIG. 7), or after exiting the shrouded return (not shown). Similarly, the hearth cars 21 may be charged with reducible material either prior to entering the shrouded return (not shown), within the shrouded return (as shown in FIG. 7), or prior to entering the furnace (as shown in FIG. 1). In FIGS. 1, 3, 5, 7, and 8 the arrows labeled "LOAD" represent charging the reducible material onto the hearth cars 21, and the arrows labeled "UNLOAD" represent discharging the hearth cars 21. Various configurations are contemplated depending upon the location of the discharging and charging processes. The hearth sections 21 may be discharged in the shrouded return 30 after passing through the cooling zone 15. In another example, a drying/preheat zone 12 may be provided in the shrouded return 30 and be capable of providing a drying/preheating atmosphere for reducible material. In this example, the hearth sections 21 may be charged prior to passing through the drying/preheat zone 12 in the shrouded return 30. When the drying/preheat zone is positioned in the shrouded return, all or a portion of the t shrouded return 30 may be between about 200° F. and 400° F. (between about 90° C. to 200° C.) to reduce devolatilization. Other combinations of these arrangements are also possible.

The heating of the reducible material in the conversion zone 13 and fusion zone 14 may be accomplished by oxy-fuel burners 16 in the roof 17 and/or side wall 18 of the furnace housing 11. The oxy-fuel burners 16 may be positioned on about 10 foot centers (about 3 m), along side walls 18, about a foot down from the roof 17 of the furnace housing 11. Alternatively or in addition, the oxy-fuel burners may be positioned in the roof 17 of the furnace housing 11. In any case, the oxy-fuel burners 16 are positioned to provide for efficient combustion of the fluidized volatile materials in the conversion zone and to efficiently reduce the reducible material to metallic iron nodules in the fusion zone 14. The oxy-fuel burners 16 should be positioned to provide for efficient heat transfer and efficient reduction of the iron oxide in the reducible material with the least energy consumption. In addition, oxygen lances 29 may be positioned in the roof 17 of the furnace housing 11 of the conversion zone 13 and the fusion zone 14 to provide additional energy for generation of heat and reduction into metallic iron nodules in the furnace. The commercially available oxygen ($O_2$) gas previous discussed may be delivered to the oxy-fuel burners 16 and/or the oxygen lances 29, either in commercial form or more likely diluted with $CO_2$ or flue gas to reduce flame temperature and improve heat transfer through the furnace.

The metallic iron material may be cooled in a cooling zone 15 after reduction and fusion in the conversion zone 13 and/or fusion zone 14 to a temperature at which the metallic iron material can be reasonably handled and further processed. This temperature is generally below 800° F. (about 425° C.) and more typically about 550° F. (about 290° C.) or below. Water spray may be used for the cooling in or beyond the cooling zone 15 adjacent the furnace housing, if desired, where provisions are made for water handling in the system. Typically, the temperature of the material on the moving hearth 20 after cooling in, and after the cooling zone 15, is about 300 to 600° F. (about 150-315° C.) depending on the design of the cooling system. The cooling zone 15 in the furnace is optional, since it may be desired in certain embodiments to perform the cooling of the metallic iron material outside the furnace housing 11.

The exit portion 80 of the hearth furnace 10 may be closed by a restricting baffle 65 that inhibits fluid flow between the outside ambient atmosphere and the atmosphere of the fusion zone 14, yet provides clearance so as not to inhibit the movement of reducible material out the furnace housing 11. The baffle 65 may also inhibit flow between the fusion zone 14 and the cooling zone 15. As such, the reducible material in the linear hearth furnace may be reduced to metallic iron nodules substantially free of air ingress. The baffle 65 may be made of a suitable refractory material or a metal material if the temperatures are sufficiently low. Similarly, the entry and exit portions of the shrouded return 30 may also be substantially closed by restricting baffles 31 to inhibit the flow between the outside atmosphere and the atmosphere within the shrouded return 30.

In the configuration shown in FIGS. 5 and 6, the drying/preheat zone may be provided in the shrouded return 30 and a gas circulation system 100 may transfer the gases from the cooling zone 15 to the drying/preheat zone 12. The hot fluids from the cooling zone 15 may be used to dry and initially heat the reducible and carbon bearing materials on the removable hearth sections 21 in the drying/preheat zone to drive off residual moisture in the materials and preheating those materials to about 500° F. (260° C.). In the embodiment shown in FIGS. 5 and 6, the drying/preheat zone 12 is positioned in the shrouded return 30. Other configurations are contemplated where the drying/preheat zone 12 and/or cooling zone 15 may be positioned in the hearth furnace 10, as illustrated in FIG. 1, or the former may be positioned in the shrouded return 30, as illustrated in FIG. 7. Fan blower 103 recirculates the gas exiting the cooling zone 15 through conduit 102 and optionally heat exchanger 101, where a cooling source such as water or air (not shown) cools the gas. Cooled gas from heat exchange 101 is then circulated by blower-fan 103 through gas conduit 102 through an inlet to the drying/preheat zone 12. The gas may be directed under horizontal baffle 97, if present. From drying/preheat zone 12, the gas circulation system 100 circulates cooled gas through conduit 105, to provide relatively cold gas to cool the reduced iron nodules and related materials in the cooling zone 15 as shown in FIG. 6. As needed, nitrogen gas may be added to the gas circulation system 100 through makeup conduit 104 to keep the gas circulation system 100 fully charged.

As explained above, the method of making metallic iron nodules may also include providing a transfer guide adapted to transfer the hearth sections between the linear hearth furnace and the shrouded return at the entry portion and the exit portion. As shown in FIG. 1, a transfer guide 90 may be positioned within the shrouded return 30. Alternatively, the transfer guide 90 may be positioned between the hearth furnace 10 and the shrouded return 30. After each hearth section 21 exits the hearth furnace 10, the transfer guide 90 may transfer the hearth sections to the shrouded return. Similarly, a transfer guide 90 may transfer heath sections 21 exiting the shrouded return 30 back to the hearth furnace 10. A transfer guide 90 may include a transfer table 91 adapted to move a hearth section from the furnace guide 92 to a shroud guide 93. The transfer table 91 may have rails 23A adapted to align with rails 23 to facilitate movement of the hearth sections. The hearth cars may be moved across the transfer table 91 by a pusher (not shown) or other suitable device adapted to move the hearth car. Alternatively, the transfer guide 90 may be a portion of the guide connecting the hearth furnace 10 to the shrouded return 30. The furnace guide 92 and shroud guide 93 may be connected to form a single guide on which the hearth sections 21 move. In either case, the hearth sections may be decoupled and recoupled as needed during the transfer process. One or more transfer guides or transfer tables 91 may be employed depending upon the configuration of the hearth furnace 10 and the shrouded return 30.

Figure 8:
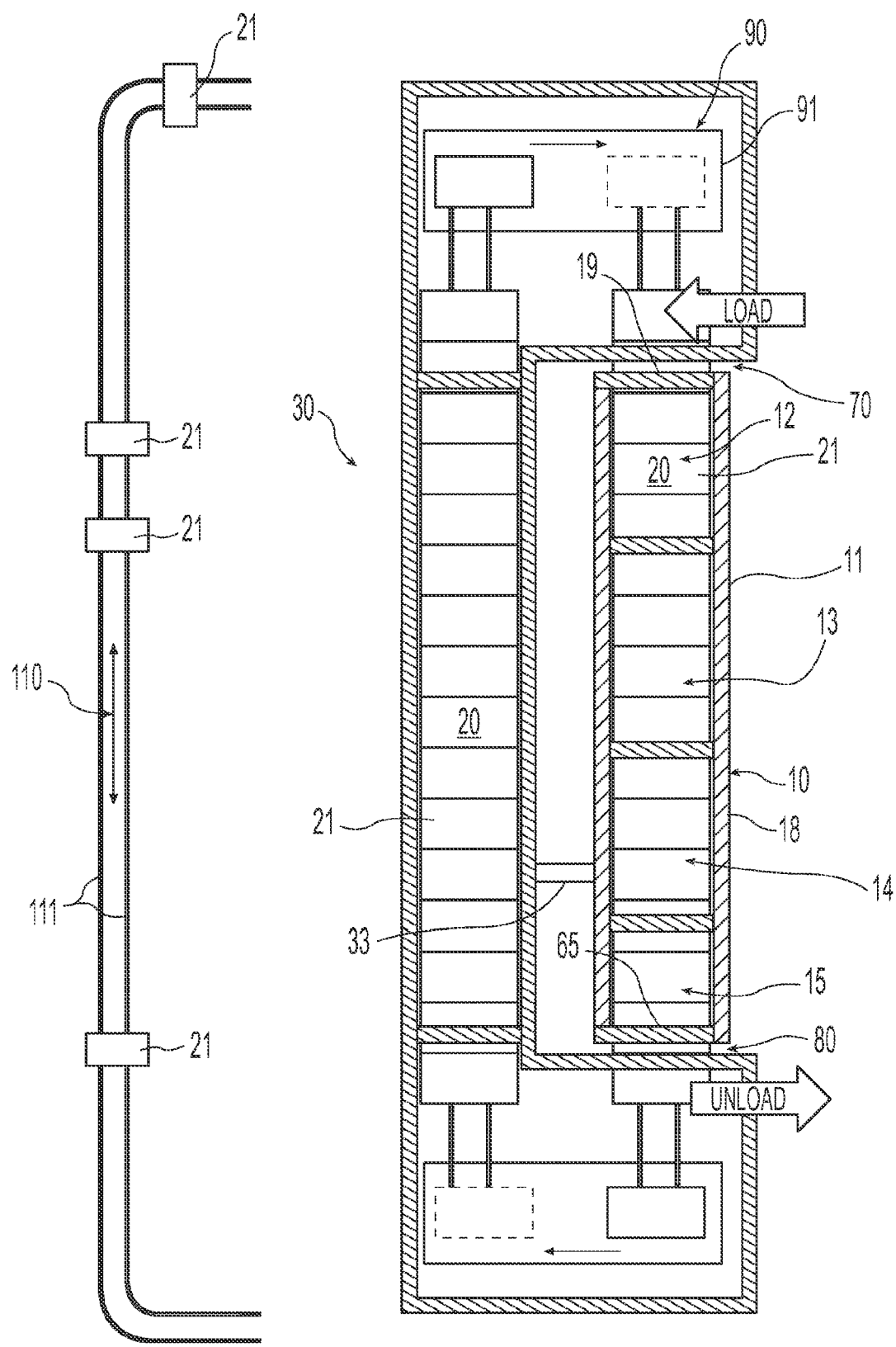
FIG. 8 is a top sectional view of a system for producing metallic iron material with a hearth maintenance system.

In another alternative, the transfer guide 90 may enable hearth sections 21 to be transferred to a hearth maintenance system 110, as shown in FIG. 8. In this example, the shrouded return 30 may include a door or section (not shown) be adapted to allow the hearth cars 21 to be removed from the shrouded return. The hearth maintenance system 110 may permit removal of hearth sections 21 from the moving hearth 20 for maintenance or repair. The hearth maintenance system 110 comprises sections of rails 111 that can connect to the transfer guides 90. The transfer table 91 may be further adapted to allow transfer of the hearth cars 21 to the hearth maintenance system 110. Thus, any removable hearth section 21 can be removed from the system, as desired, at either end of the hearth furnace 10 and transferred to the hearth maintenance system 110. The hearth maintenance system 110 thus allows hearth sections 21 to be removed from the moving hearth 20 and to be reintroduced to the moving hearth 20 without interrupting the operation of the hearth furnace 10.

While the invention has been described with detailed reference to one or more embodiments, the disclosure is to be considered as illustrative and not restrictive. Modifications and alterations will occur to those skilled in the art upon a reading and understanding of this specification. It is intended to include all such modifications and alterations in so far as they come within the scope of the claims, or the equivalents thereof.

What is claimed is:

1. A method of making metallic iron nodules with reduced CO and $CO_2$ emissions comprising the steps of:
   a. assembling a linear hearth furnace having an entry portion and an exit portion, at least a conversion zone and a fusion zone, and a moving hearth adapted to move reducible iron bearing material through the furnace on contiguous hearth sections;
   b. assembling a shrouded return substantially free of air ingress extending adjacent to the furnace through which hearth sections can move from adjacent the exit portion to adjacent the entry portion of the linear hearth furnace;
   c. adjacent the exit portion, transferring the hearth sections from the linear hearth furnace to the shrouded return;
   d. reducing reducible material in the linear hearth furnace to metallic iron nodules; and
   e. transporting gases from at least the fusion zone to the shrouded return to heat the hearth sections while in the shrouded return.

2. The method of claim 1 further comprising the step of:
supplying commercially available $O_2$ gas to at least the fusion zone of the linear hearth furnace to reduce and fuse the reducible iron bearing material to metallic iron nodules and form $CO_2$.

3. The method of claim 1 further comprising the step of:
mixing commercially available $O_2$ gas with at least one other gas to form a mixed gas; and
supplying the mixed gas to at least the fusion zone to reduce a flame temperature within the fusion zone.

4. The method of claim 1 further comprising the step of:
directing $CO_2$ from the linear hearth furnace to the shrouded return.

5. The method of claim 4 further comprising the step of:
cleaning at least a portion of the $CO_2$ to produce a commercially viable $CO_2$ gas stream.

6. The method of claim 1 further comprising the step of:
Directing flue gas comprising $CO_2$ from the linear hearth furnace to the shrouded return.

7. The method of claim 6 further comprising the step of:
cleaning at least a portion of the flue gas to produce a commercially viable $CO_2$ gas stream.

8. The method of claim 6 further comprising the step of:
directing at least a portion of the flue gas through the shrouded return to a gasifier adapted to produce syn-gas.

9. The method of claim 1 further comprising:
directing flue gas from the linear hearth furnace to a gasifier adapted to produce syn-gas.

10. The method of claim 1 further comprising the step of:
providing at least one passageway capable of transferring gases from at least the fusion zone to the shrouded return.

11. The method of claim 1 further comprising the step of:
prior to the step of reducing reducible material in the linear hearth furnace, drying and preheating the reducible material in the linear hearth furnace.

12. The method of claim 1 further comprising the step of:
prior to the step of reducing reducible material in the linear hearth furnace, drying and preheating the reducible material in the shrouded return without substantial fluidization of volatiles in the reducible material.

13. The method of claim 12 further comprising the steps of:
charging the hearth sections before or after entry into the shrouded return, and heating-reducible material in the shrouded return.

14. The method of claim 13 where charging the hearth sections is accomplished outside of the shrouded return.

15. The method of claim 13 where charging the hearth sections is accomplished inside the shrouded return.

16. The method of claim 1 further comprising the steps of:
prior to the step of reducing reducible material in the linear hearth furnace,
drying and preheating the reducible material in the shrouded return;
capturing volatiles from drying and preheating the reducible material; and
transferring the volatiles to the linear hearth furnace for combustion.

17. The method of claim 1 further comprising:
providing a transfer guide adapted to transfer the hearth sections between the linear hearth furnace and shrouded return.

18. A system for making metallic iron nodules with reduced $CO_2$ emissions comprising:
a. a linear hearth furnace having an entry portion and an exit portion, at least a conversion zone and a fusion zone, and a moving hearth with a plurality of hearth sections adapted to move reducible iron bearing material through the linear hearth furnace on a guide;
b. a shrouded return positioned adjacent the linear hearth furnace through which the hearth sections can move on the guide from adjacent the exit portion to adjacent the entry portion of the linear hearth furnace;
c. passageways adapted to transport gases generated in at least the fusion zone of the furnace to the shrouded return; and
d. transport devices adapted to transport the hearth sections from the exit portion of the furnace to the shrouded return and from the shrouded return to the entry portion of the furnace.

19. The system of claim 18 where the linear hearth furnace further comprises a drying/preheat zone.

20. The system of claim 18 further comprising:
a drying/preheat zone in the shrouded return; and
a passageway adapted to transfer volatiles from the drying/preheat zone to the conversion zone or fusion zone.

21. The system of claim 18 further comprising:
a gasifier adapted to produce syn-gas, and at least one gas passageway capable of directing gases from the shrouded return to the gasifier.

22. The system of claim 18 further comprising:
a gasifier adapted to produce syn-gas, and at least one gas passageway capable of directing gases from the linear hearth furnace to the gasifier.

23. The system of claim 18 further comprising:
a scrubber adapted to produce a commercially viable $CO_2$ gas stream, and at least one gas passageway capable of directing gases from the shrouded return to the scrubber.

24. The system of claim 18 further comprising:
a scrubber adapted to produce a commercially viable $CO_2$ gas stream, and at least one gas passageway capable of directing gases from the linear hearth furnace to the scrubber.

25. The system of claim 18 where the shrouded return further comprises baffles adapted to direct the flow of gases and improve heat transfer from the gases to the hearth sections.

* * * * *

UNITED STATES PATENT AND TRADEMARK OFFICE
CERTIFICATE OF CORRECTION

PATENT NO. : 8,858,678 B2
APPLICATION NO. : 13/499021
DATED : October 14, 2014
INVENTOR(S) : Richard Kieser et al.

It is certified that error appears in the above-identified patent and that said Letters Patent is hereby corrected as shown below:

IN THE SPECIFICATION

Replace the paragraph under the section titled "GOVERNMENT INTERESTS", found in column 1, lines 12-15, with the following paragraph:

"This invention was made with government support under DE-FG36-05GO15185 awarded by the Department of Energy. The government has certain rights in the invention."

Signed and Sealed this
Thirteenth Day of October, 2015

Michelle K. Lee
*Director of the United States Patent and Trademark Office*